United States Patent
Aoki et al.

(10) Patent No.: US 12,077,178 B2
(45) Date of Patent: Sep. 3, 2024

(54) AIMING DEVICE, DRIVING CONTROL SYSTEM, AND METHOD FOR CALCULATING CORRECTION AMOUNT FOR SENSOR DATA

(71) Applicant: HITACHI ASTEMO, LTD., Hitachinaka (JP)

(72) Inventors: Naoto Aoki, Ibaraki (JP); Haruki Nishimura, Ibaraki (JP); Shunsuke Matsuo, Ibaraki (JP); Akira Kuriyama, Ibaraki (JP); Tatsuhiko Monji, Ibaraki (JP)

(73) Assignee: Hitachi Astemo, Ltd., Ibaraki (JP)

( * ) Notice: Subject to any disclaimer, the term of this patent is extended or adjusted under 35 U.S.C. 154(b) by 260 days.

(21) Appl. No.: 17/628,498

(22) PCT Filed: Jul. 14, 2020

(86) PCT No.: PCT/JP2020/027321
§ 371 (c)(1),
(2) Date: Jan. 19, 2022

(87) PCT Pub. No.: WO2021/024711
PCT Pub. Date: Feb. 11, 2021

(65) Prior Publication Data
US 2022/0281476 A1    Sep. 8, 2022

(30) Foreign Application Priority Data
Aug. 2, 2019  (JP) .................................. 2019-142887

(51) Int. Cl.
*B60W 60/00* (2020.01)
*B60W 40/09* (2012.01)
(Continued)

(52) U.S. Cl.
CPC .......... *B60W 60/001* (2020.02); *B60W 40/09* (2013.01); *B60W 40/12* (2013.01);
(Continued)

(58) Field of Classification Search
None
See application file for complete search history.

(56) References Cited

U.S. PATENT DOCUMENTS 5,986,601 A    11/1999   Sugimoto
7,825,849 B2 *  11/2010   Tsuchida ................. G01S 17/86
                                                    342/52
(Continued)

FOREIGN PATENT DOCUMENTS

JP      H11-014748 A        1/1999
JP      2010249613 A  *    11/2010
(Continued)

OTHER PUBLICATIONS

International Search Report with English translation and Written Opinion issued in corresponding application No. PCT/JP2020/027321 dated Nov. 10, 2020.

*Primary Examiner* — Jaime Figueroa
*Assistant Examiner* — Atticus A Cameron
(74) *Attorney, Agent, or Firm* — Foley & Lardner LLP

(57) ABSTRACT

An axial deviation of the sensor is corrected. An aiming device that calculates a correction parameter for correcting a detection result of a target sensor includes an estimated-track generation unit that detects a track of a target for a period when an own vehicle moves, by using information of a movement of the own vehicle, which is detected by a movement sensor, and generates a plurality of estimated tracks having different start-point positions from the detected track of the target by using a first variable group, a corrected-track generation unit that generates a plurality of
(Continued)

corrected tracks from the track of the target around the own vehicle, which is detected by the target sensor, by using a second variable group, and a correction parameter calculation unit that selects a combination in which a difference between the estimated track and the corrected track is small, and calculates the correction parameter for correcting a displacement of the target sensor by using a first variable related to the selected estimated track and a second variable related to the selected corrected track.

8 Claims, 8 Drawing Sheets

(51) Int. Cl.
| | | |
|---|---|---|
| *B60W 40/12* | (2012.01) | |
| *G01S 7/40* | (2006.01) | |
| *G01S 7/497* | (2006.01) | |
| *G01S 13/931* | (2020.01) | |
| *G01S 17/93* | (2020.01) | |
| *G06F 18/25* | (2023.01) | |
| *G08G 1/16* | (2006.01) | |

(52) U.S. Cl.
CPC ....... *G06F 18/25* (2023.01); *B60W 2420/408* (2024.01); *B60W 2540/30* (2013.01)

(56) References Cited

U.S. PATENT DOCUMENTS

| | | | |
|---|---|---|---|
| 11,867,795 B2* | 1/2024 | Novoselsky | G01S 13/726 |
| 2014/0333473 A1 | 11/2014 | Steinbuch | |
| 2021/0033722 A1* | 2/2021 | Søndergaard | G01S 13/89 |
| 2022/0197285 A1* | 6/2022 | Gassend | G01S 7/4972 |
| 2023/0003877 A1* | 1/2023 | Suzuki | G01S 13/931 |

FOREIGN PATENT DOCUMENTS

| | | |
|---|---|---|
| JP | 2012-163495 A | 8/2012 |
| JP | 2015-078925 A | 4/2015 |
| JP | 2018-179926 A | 11/2018 |

* cited by examiner

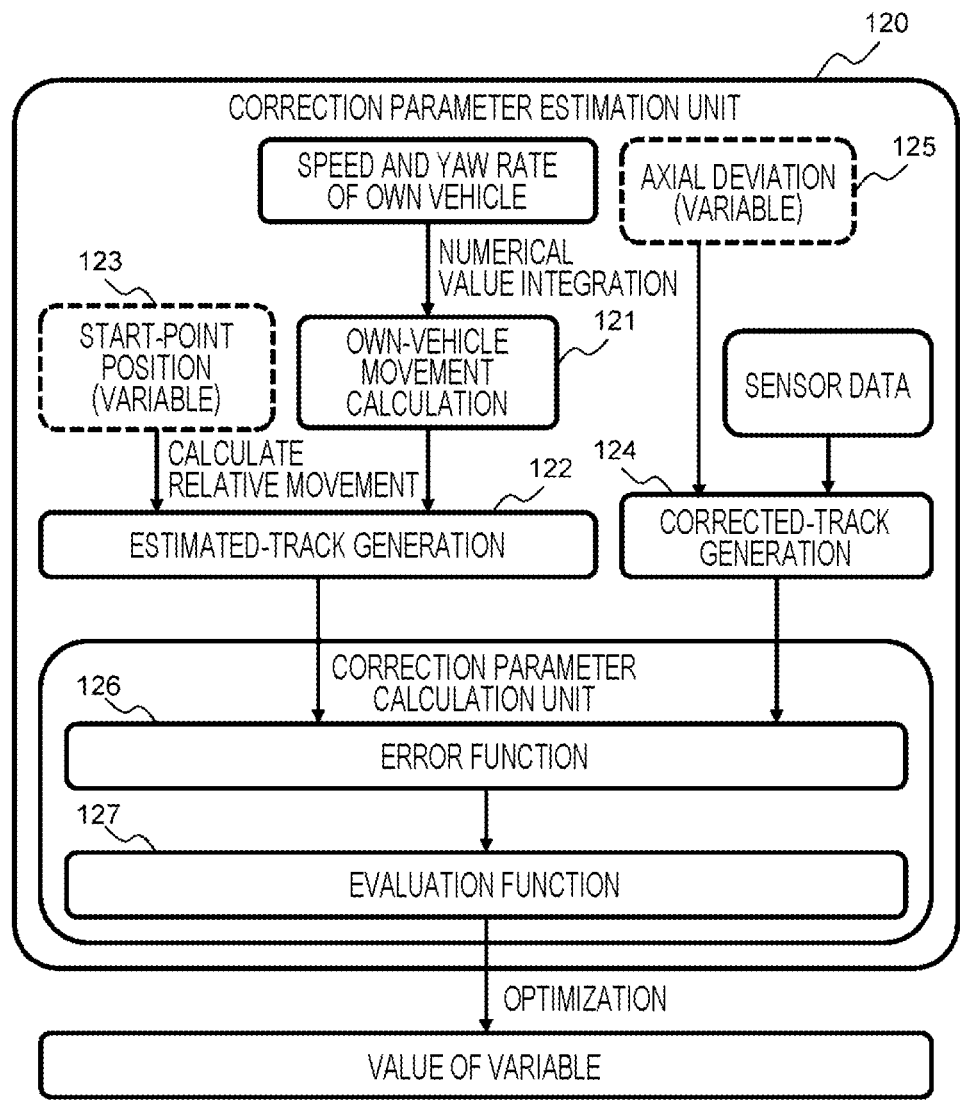

FIG. 3

(A) [INPUT]
- STATIONARY TARGET
- TRAVELING STRAIGHT AT CONSTANT SPEED

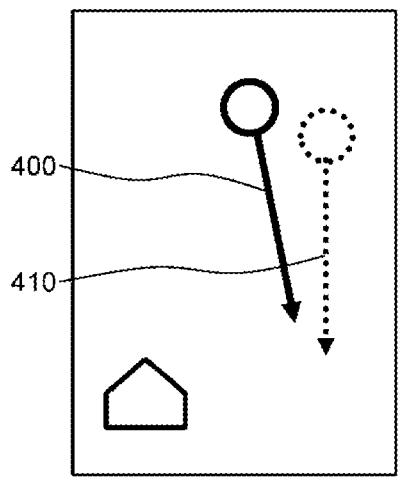

(B) [ESTIMATED TRACK]
TRACK OF TARGET, WHICH IS PREDICTED FROM MOVEMENT OF OWN VEHICLE

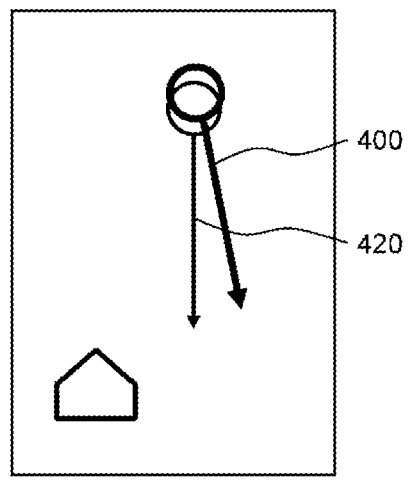

(C) [CORRECTED TRACK]
TRACK OF SENSOR DATA, IN WHICH AXIAL DEVIATION IS CORRECTED

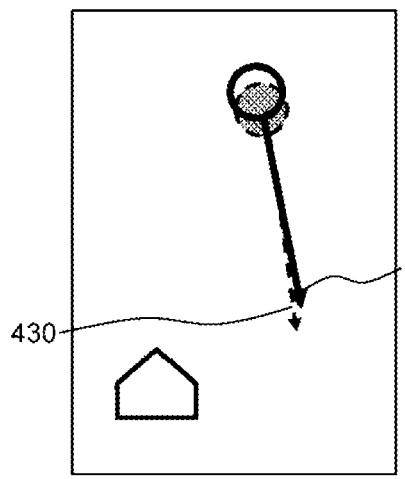

(D) [OPTIMIZATION]
SEARCH FOR SETTING THAT CAUSES ESTIMATED TRACK TO COINCIDE WITH CORRECTED TRACK

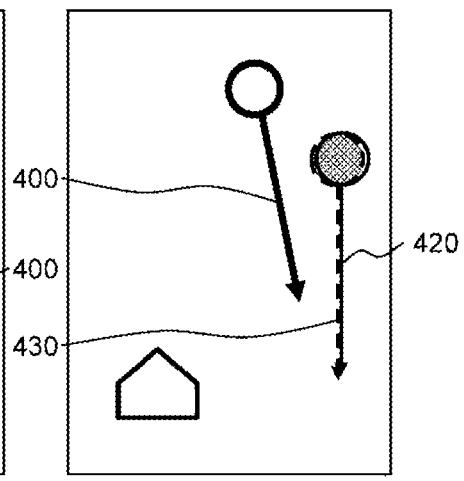

○ SENSOR DATA 400
◌ CORRECT SOLUTION 410
○ ESTIMATED TRACK 420
● CORRECTED TRACK 430

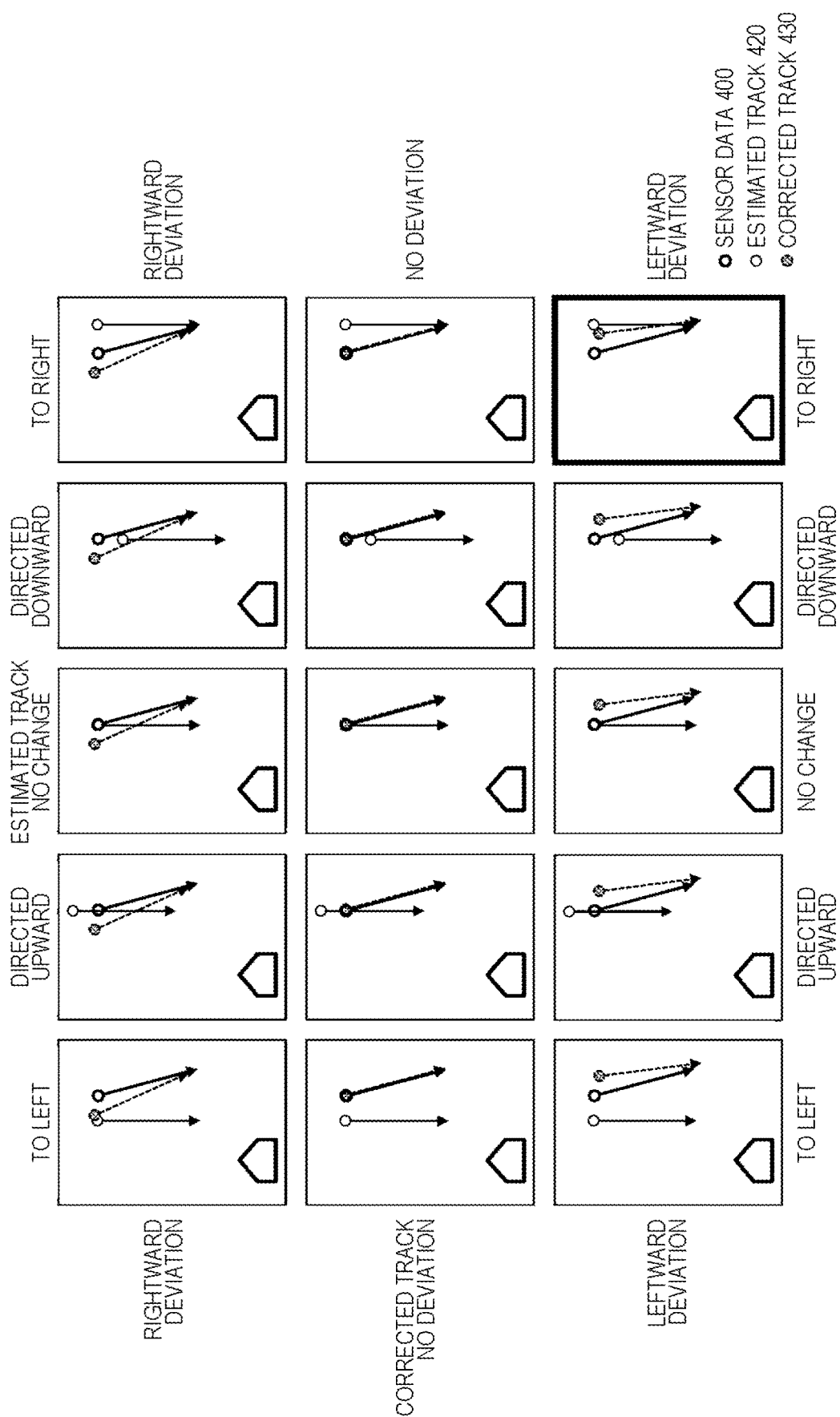

AIMING DEVICE, DRIVING CONTROL SYSTEM, AND METHOD FOR CALCULATING CORRECTION AMOUNT FOR SENSOR DATA

TECHNICAL FIELD

The present invention relates to an in-vehicle control device, and particularly to an aiming device that corrects sensor data.

BACKGROUND ART

A driving assistance system and an autonomous driving system have been developed to achieve various purposes such as reduction of traffic accidents, reduction of loads on drivers, improvement of fuel efficiency for reducing loads on the global environment, and provision of transportation means to vulnerable persons for realizing a sustainable society. In the driving assistance system and the autonomous driving system, a plurality of vehicle periphery monitoring sensors is provided to monitor the periphery of a vehicle instead of the driver. Furthermore, in order to guarantee the safety of the systems, a function of performing correction even when the mounting angle of the vehicle periphery monitoring sensor is deviated is required.

Background art of the present technical field includes the following prior art. PTL 1 (JP 2015-078925 A) discloses a periphery monitoring device that determines a deviation of a detection axis of a distance measuring sensor from a deviation between a position on a vehicle orthogonal coordinate system specified by a first position specifying unit and a position on the vehicle orthogonal coordinate system specified by a second position specifying unit, for an object present in an overlapping region between detection ranges of the distance measuring sensor in which an azimuth in which a reference target of which a relative position to the periphery monitoring device is determined to be a predetermined position is included in the detection range and the distance measuring sensor having the detection range that partially overlaps the detection range of the distance measuring sensor (see Abstract).

In addition, PTL 2 (JP 2010-249613 A) discloses an obstacle recognition device that recognizes an obstacle by combining a plurality of pieces of sensor information. The obstacle recognition device includes a front camera that acquires first parameter information regarding the obstacle, a millimeter-wave radar that acquires second parameter information regarding the obstacle, a correction unit that calculates an axial deviation amount of an azimuth angle of the front camera or the millimeter-wave radar based on the first parameter information acquired by the front camera and the second parameter information acquired by the millimeter-wave radar, and corrects the axial deviation of the front camera or the millimeter-wave radar based on the calculated axial deviation amount, and a storage unit that stores the axial deviation amount.

CITATION LIST

Patent Literature

PTL 1: JP 2015-078925 A
PTL 2: JP 2010-249613 A

SUMMARY OF INVENTION

Technical Problem

In PTL 1, the deviation of the detection axis of the sensor is determined based on the detection position of an object present in the region in which the detection regions of the plurality of sensors overlap each other. However, PTL 1 has a problem that it is not possible to determine the axial deviation when the detection regions of the plurality of sensors do not overlap each other. Further, in PTL 2, the deviation of the detection axis of the sensor is determined based on the second parameter information regarding the obstacle present in the region in which the detection regions of the plurality of sensors overlap each other. However, PTL 2 has a problem that, when the detection regions of the plurality of sensors do not overlap each other, it is not possible to determine whether the first parameter and the second parameter are based on the identical target, and thus, it is not possible to determine the axial deviation.

Solution to Problem

A representative example of the invention disclosed in this application is as follows. That is, there is provided an aiming device that calculates a correction parameter for correcting a detection result of a target sensor. The aiming device includes an estimated-track generation unit that detects a track of a target for a period when an own vehicle moves, by using information of a movement of the own vehicle, which is detected by a movement sensor, and generates a plurality of estimated tracks having different start-point positions from the detected track of the target by using a first variable group, a corrected-track generation unit that generates a plurality of corrected tracks from the track of the target around the own vehicle, which is detected by the target sensor, by using a second variable group, and a correction parameter calculation unit that selects a combination in which a difference between the estimated track and the corrected track is small, and calculates the correction parameter for correcting a displacement of the target sensor by using a first variable related to the selected estimated track and a second variable related to the selected corrected track.

Advantageous Effects of Invention

According to the present invention, it is possible to correct the axial deviation of the sensor. Objects, configurations, and effects other than those described above will be clarified by the descriptions of the following embodiments.

BRIEF DESCRIPTION OF DRAWINGS

FIG. 2 is a functional block diagram illustrating a correction parameter estimation unit in Embodiment 1.

FIG. 3 is a diagram illustrating a concept of a correction parameter estimation process in Embodiment 1.

FIG. 4 is a diagram illustrating a concept of a process of evaluating a combination of an estimated track and a corrected track in Embodiment 1.

DESCRIPTION OF EMBODIMENTS

Hereinafter, best modes for carrying out the present invention will be described in detail with reference to the drawings. In all the drawings for describing modes for carrying out the invention, blocks or elements having the same function are denoted by the same reference signs, and repetitive description thereof will be omitted.

Embodiment 1

Figure 1:
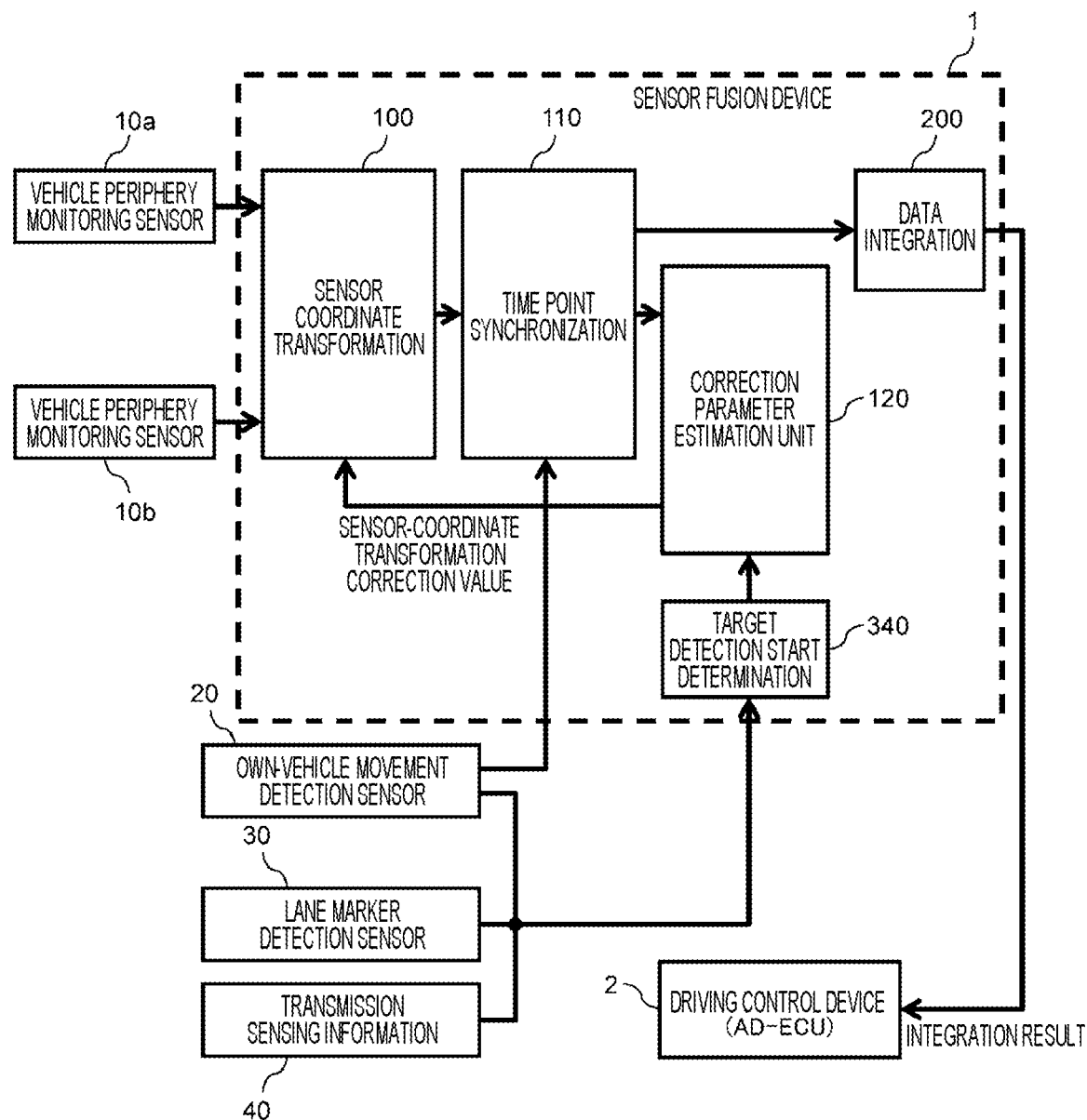
FIG. 1 is a functional block diagram illustrating an embodiment of a sensor fusion device having a sensor aiming function according to Embodiment 1 of the present invention.

FIG. 1 is a functional block diagram illustrating an embodiment of a sensor fusion device 1 having a sensor aiming function.

As illustrated in FIG. 1, the sensor fusion device 1 in the present embodiment includes a sensor coordinate transformation unit 100, a sensor time-point synchronization unit 110, a correction parameter estimation unit 120, a sensor data integration unit 200, and a target detection start determination unit 340. A sensor aiming function is configured by units other than the sensor data integration unit 200 in the sensor fusion device 1. A sensor aiming device is realized by the units other than the sensor data integration unit 200a. Output signals of a first vehicle periphery monitoring sensor 10a, a second vehicle periphery monitoring sensor 10b, an own-vehicle movement detection sensor 20, and a lane marker detection sensor 30 are input to the sensor fusion device 1, and transmission sensing information 40 is input to the sensor fusion device 1.

The first and second vehicle periphery monitoring sensors 10a and 10b are sensors that detect a target around the own vehicle. The own-vehicle movement detection sensor 20 is a sensor group that detects the speed, the yaw rate, and the steering angle of the own vehicle. The lane marker detection sensor 30 is a sensor that detects a lane marker (for example, a roadway center line, a lane boundary line, and a roadway outer line formed by paint, a road stud, or the like). The transmission sensing information 40 indicates a travel environment (for example, traveling map data including a curvature of a road and the like) of the own vehicle.

The sensor fusion device 1 (electronic control device) and various sensors (first vehicle periphery monitoring sensor 10a, second vehicle periphery monitoring sensor 10b, and the like) in the present embodiment include a computer (microcomputer) including an arithmetic operation device, a memory, and an input/output device.

The arithmetic operation device includes a processor and executes a program stored in the memory. A portion of the processing performed by the arithmetic operation device executing the program may be executed by another arithmetic operation device (for example, hardware such as a field programmable gate array (FPGA) and an application specific integrated circuit (ASIC)).

The memory includes a ROM and a RAM which are non-volatile storage elements. The ROM stores an invariable program (for example, BIOS) and the like. The RAM includes a high-speed and volatile storage element such as a dynamic random access memory (DRAM) and a non-volatile storage element such as a static random access memory (SRAM). The RAM stores a program executed by the arithmetic operation device and data used when the program is executed.

The input/output device is an interface that transmits processing contents by the electronic control device and the sensors to the outside or receives data from the outside, in accordance with a predetermined protocol.

The program executed by the arithmetic operation device is stored in the non-volatile memory being a non-transitory storage medium of the electronic control device and the sensors.

The sensor coordinate transformation unit 100 transforms the relative coordinates of an object (target) outside the vehicle with respect to the own vehicle into unified relative coordinates, and outputs the unified relative coordinates to the sensor time-point synchronization unit 110. The relative coordinates are output from the first vehicle periphery monitoring sensor 10a and the second vehicle periphery monitoring sensor 10b. Here, the object outside the vehicle is a stationary object. The sensor fusion device 1 in the present embodiment estimates a sensor-coordinate transformation correction value by using the stationary object. As in Embodiment 3 described later, the object outside the vehicle may include a stationary object and a moving object, and the sensor fusion device 1 may estimate a sensor-coordinate transformation correction parameter by using both the stationary object and the moving object. The unified relative coordinates refer to a coordinate system in which coordinates based on data output from a plurality of vehicle periphery monitoring sensors 10a and 10b are collected. For example, the center of the front end of the own vehicle is defined as an origin, the forward direction of the own vehicle is defined as x, and the leftward direction of the own vehicle is defined as y.

The detection results of the speed, the yaw rate, and the steering angle of the own vehicle by the own-vehicle movement detection sensor 20 are input to the sensor time-point synchronization unit 110. The sensor time-point synchronization unit 110 corrects the input unified relative coordinates of the target detected by the first vehicle periphery monitoring sensor 10a and the input unified relative coordinates of the target detected by the second vehicle periphery monitoring sensor 10b to the unified relative coordinates at a predetermined timing by using the detection results obtained by the own-vehicle movement detection sensor 20 detecting the speed, the yaw rate, and the steering angle of the own vehicle. In addition, the sensor time-point synchronization unit 110 synchronizes the time points of the detection results of the sensors with each other, and outputs the unified relative coordinates of the target, which are time-synchronized.

The sensor data integration unit 200 integrates all pieces of input information and outputs an integration result to the driving control device 2. The driving control device 2 is an autonomous driving system (ADECU) or a driving support system that controls driving of the vehicle by using an output from the sensor fusion device 1.

The target detection start determination unit 340 determines that the own vehicle is in a desired traveling state (for example, the own vehicle travels straight or travels on a road having a curvature of a predetermined value or less), based on pieces of information output from the own-vehicle movement detection sensor 20, the lane marker detection sensor 30, and the transmission sensing information 40, and outputs a target detection start flag to the correction parameter estimation unit 120.

The correction parameter estimation unit 120 selects a target to be used to calculate the sensor-coordinate transformation correction value among the input targets. The correction parameter estimation unit 120 calculates the sensor-coordinate transformation correction value of the first vehicle periphery monitoring sensor 10a and the sensor-coordinate transformation correction value of the second vehicle periphery monitoring sensor 10b by using the coordinate values of the target, and outputs the calculated values to the sensor coordinate transformation unit 100.

FIG. 2 is a functional block diagram illustrating the correction parameter estimation unit 120 in Embodiment 1. FIG. 3 is a diagram illustrating a concept of a correction parameter estimation process. FIG. 4 is a diagram illustrating a concept of a process of evaluating a combination of an estimated track 420 and a corrected track 430. FIGS. 3 and 4 are represented in a relative coordinate system based on the own vehicle, and a stationary target is also represented in a movement track.

The correction parameter estimation unit 120 compares the estimated track 420 being a track of the target, which is predicted from the own vehicle movement, with the corrected track 430 being a track of the sensor data in which the axial deviation is corrected. Then, the correction parameter estimation unit 120 searches for a combination in which the two tracks are close to each other, and calculates a sensor-coordinate transformation correction value. The correction parameter estimation unit 120 includes an own-vehicle movement calculation unit 121, an estimated-track generation unit 122, a corrected-track generation unit 124, an error function 126, and an evaluation function 127.

The own-vehicle movement calculation unit 121 calculates the movement of the own vehicle by using the detection results of the speed, the yaw rate, and the steering angle of the own vehicle by the own-vehicle movement detection sensor 20. For example, the movement distance can be calculated by integrating the speed over time, and a yaw angle can be calculated by integrating the yaw rate over time.

The estimated-track generation unit 122 generates a plurality of estimated tracks 420 having different start-point positions by using a start-point position variable 123 from the track of the target, which is predicted from the movement of the own vehicle. The movement of the own vehicle is calculated by the own-vehicle movement calculation unit 121. The start-point position variable 123 is a numerical string for giving a deviation in the start-point position that causes the estimated track 420 generated by the estimated-track generation unit 122 to vary. The number of generated estimated tracks 420 and the range of the deviation are determined by the start-point position variable 123. A function of giving the start-point position variable 123 may be determined, and the start-point position variable 123 may be generated by such a function.

For example, when sensor data 400 indicated by a thick solid line is obtained from either the vehicle periphery monitoring sensor 10a or 10b and the true trajectory 410 of the target is indicated by a dotted line as illustrated in FIG. 3(A), the estimated track 420 indicated by a thin solid line is generated as illustrated in FIG. 3(B). For example, when the own vehicle travels straight, a stationary target moves in parallel with the traveling direction of the own vehicle. Thus, an estimated trajectory is generated in parallel with the traveling direction of the own vehicle and in accordance with the speed of the own vehicle, with the position (start point) obtained by the sensor data 400, as a reference. The start-point position of the generated estimated track 420 and the start-point position of the sensor data 400 are the same as each other, but are slightly shifted in FIG. 3(B) for convenience of understanding.

The corrected-track generation unit 124 generates a plurality of tracks having different movement directions by using an axial deviation variable 125 for each of the targets output from the first and second vehicle periphery monitoring sensors 10a and 10b. The axial deviation variable 125 is a numerical string for giving a deviation of an angular direction that causes the corrected track 430 of the target generated by the corrected-track generation unit 124 to vary. The number of generated corrected tracks 430 of the target and the range of the deviation are determined by the axial deviation variable 125. A function of giving the axial deviation variable 125 may be determined, and the axial deviation variable 125 may be generated by such a function.

For example, as illustrated in FIG. 3(C), the corrected track 430 in which the deviation amount of the vehicle periphery monitoring sensor is taken into consideration is generated with the start-point position of the sensor data 400 as a reference. Since the deviation amounts of the vehicle periphery monitoring sensors 10a and 10b are unknown, a plurality of corrected tracks 430 are generated by using a plurality of deviation amounts within a range of an assumed deviation amount. The start-point position of the generated corrected track 430 and the start-point position of the sensor data 400 are the same as each other, but are slightly shifted in FIG. 3(C) for convenience of understanding.

As described later in Embodiment 2, the axial deviation variable 125 may give a deviation of the position instead of the angular direction or together with the angular direction. It is possible to cause the start-point position to vary in addition to the movement direction of the corrected track 430 of the target by the deviation of the position, and it is possible to calculate a sensor-coordinate transformation correction value for correcting an error other than the axial deviation described later.

The error function 126 calculates a difference between the estimated track 420 generated by the estimated-track generation unit 122 and the corrected track 430 generated by the corrected-track generation unit 124. For example, as will be described later, the error function 126 compares the plurality of estimated tracks 420 and the plurality of corrected tracks 430 with each other in all combinations from the viewpoint of translation, rotation, and expansion/contraction, and calculates a difference between the estimated track 420 and the corrected track 430 in each combination.

The evaluation function 127 evaluates all the combinations of the estimated tracks 420 and the corrected tracks 430 of all targets, between which differences have been calculated by the error function 126, and selects a combination having a small difference (see FIG. 3(D)).

By performing such an error evaluation calculation for each of the vehicle periphery monitoring sensors for all targets, the sensor-coordinate transformation correction value of each of the vehicle periphery monitoring sensors can be calculated.

As illustrated in FIG. 4, the estimated-track generation unit 122 generates a plurality of estimated tracks 420 having different start-point positions in left and right directions, and front and rear directions. The corrected-track generation unit 124 generates a plurality of corrected tracks 430 having different movement directions.

The evaluation function 127 evaluates a difference between the estimated track 420 and the corrected track 430 calculated by the error function 126, and selects a combination in which the estimated track 420 and the corrected track 430 are closest to each other. In the example illustrated in FIG. 4, when the estimated track 420 is displaced to the right and the corrected track 430 is deviated to the left, the estimated track 420 and the corrected track 430 are closest to each other. The sensor-coordinate transformation correction value is calculated by using the displacement amount of the estimated track 420 and the deviation amount of the corrected track 430 in this case.

Figure 5:
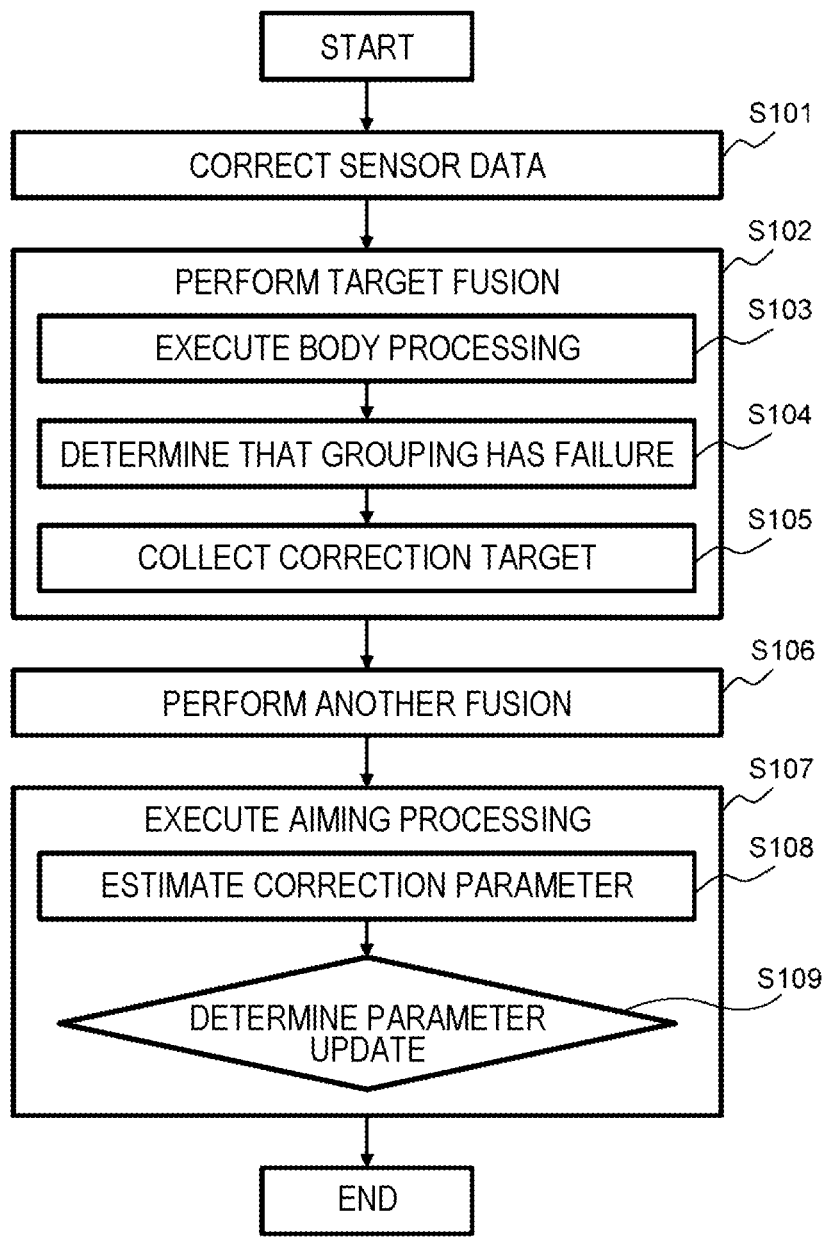
FIG. 5 is a flowchart illustrating fusion processing in Embodiment 1.

FIG. 5 is a flowchart illustrating fusion processing.

If the sensor-coordinate transformation correction value has already been calculated, the coordinates of the target detected by the first and second vehicle periphery monitoring sensors 10a and 10b are corrected by using the sensor-coordinate transformation correction value (S101).

Then, target fusion processing of specifying the position of the target is performed by using the correction values of the coordinates of the target detected by the plurality of sensors (S102). The target fusion processing includes a body process (S103), a grouping failure determination process (S104), and a correction target collection process (S105). In the body process (S103), the correction values of the coordinates of the plurality of targets are grouped to estimate the true position of the target. For example, the most reliable correction values of the coordinates of the target may be selected, or the correction values of the plurality of coordinates may be weighted and averaged in accordance with the reliability. In the grouping failure determination process (S104), target data of which grouping is not possible is detected.

There is a possibility that the mounting positions of the vehicle periphery monitoring sensors 10a and 10b that have detected the target of which grouping is not possible deviate. Thus, in the correction target collection process (S105), collection is performed by using, as correction targets, the vehicle periphery monitoring sensors 10a and 10b that have detected the target of which the grouping is not possible.

Then, another fusion processing is performed (S106). In the other fusion processing, correct information of lane markers and signals is determined from information acquired by a plurality of sensors such as lane marker fusion and signal information fusion.

Then, an aiming process (S107) is executed. The aiming process (S107) includes a correction parameter estimation process (S108) and a parameter update determination process (S109). In the correction parameter estimation process (S108), the correction parameter estimation unit 120 compares the estimated track 420 being a track of the target, which is predicted from the own vehicle movement, with the corrected track 430 being a track of the sensor data in which the axial deviation is corrected. Then, the correction parameter estimation unit 120 selects a combination in which the two tracks are close to each other, and calculates a sensor-coordinate transformation correction value.

In the parameter update determination process (S109), it is determined whether to update the sensor-coordinate transformation correction value. For example, as described in Embodiment 4 described later, when an impact sensor or a temperature sensor detects an abnormal acceleration or temperature, there is a possibility that abnormality has occurred in the first and second vehicle periphery monitoring sensors 10a and 10b. Thus, the sensor-coordinate transformation correction value is updated. On the other hand, if the impact sensor or the temperature sensor does not detect the abnormal acceleration or temperature, the sensor-coordinate transformation correction value may not be updated.

Figure 6:
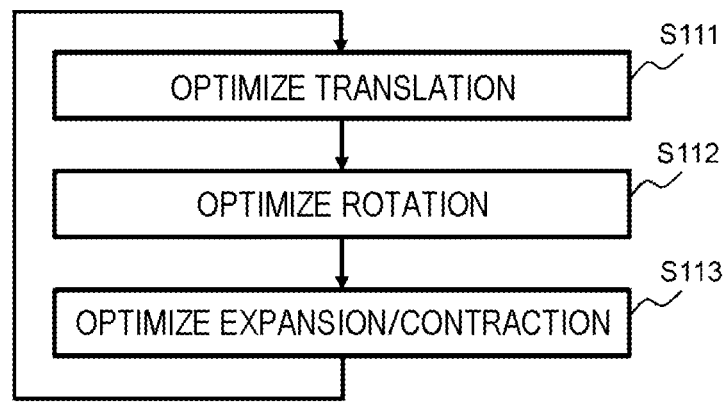
FIG. 6 is a flowchart illustrating a process in which an evaluation function in Embodiment 1 evaluates the combination of the estimated track and the corrected track.

FIG. 6 is a flowchart illustrating a process in which the evaluation function 127 evaluates a combination of the estimated track 420 and the corrected track 430 in the correction parameter estimation process (S108).

The evaluation function 127 evaluates a combination of the estimated track 420 and the corrected track 430 from the viewpoint of translation, rotation, and expansion/contraction. The translation means a difference between the centroid position of the estimated track 420 and the centroid position of the corrected track 430. The rotation means a difference between the direction of the estimated track 420 and the direction of the corrected track 430. The expansion/contraction means a difference between the length of the estimated track 420 and the length of the corrected track 430.

First, the evaluation function 127 executes a translation optimization process (S111) of specifying a predetermined number (for example, 50%) of combinations in ascending order of the difference in centroid position among a plurality of combinations of the estimated track 420 and the corrected track 430. Then, the evaluation function 127 executes a rotation optimization process (S112) of specifying a predetermined number (for example, 50%) of combinations in ascending order of the difference in direction among a plurality of combinations of the estimated track 420 and the corrected track 430, which are specified from the viewpoint of translation. Then, the evaluation function 127 executes an expansion/contraction optimization process (S113) of specifying a predetermined number (for example, 50%) of combinations in ascending order of the difference in length among a plurality of combinations of the estimated track 420 and the corrected track 430, which are specified from the viewpoint of rotation. When each of the translation optimization process (S111), the rotation optimization process (S112), and the expansion/contraction optimization process (S113) is executed once, a combination of 12.5% remains.

Then, a process of executing each of the translation optimization process (S111), the rotation optimization process (S112), and the expansion/contraction optimization process (S113) once is repeated to select one combination for calculating the sensor-coordinate transformation correction value.

The evaluation function 127 may calculate an evaluation value obtained by evaluating translation (difference in centroid position), rotation (difference in direction), and expansion/contraction (difference in length) with a predetermined weight, and select the combination having the smallest evaluation value as a combination for calculating the sensor-coordinate transformation correction value, instead of the process illustrated in FIG. 6.

As described above, according to Embodiment 1, it is possible to calculate the sensor-coordinate transformation correction value for correcting the axial deviation between the first and second vehicle periphery monitoring sensors 10a and 10b, and to automatically correct the axial deviation of the sensors.

Embodiment 2

Figure 7:
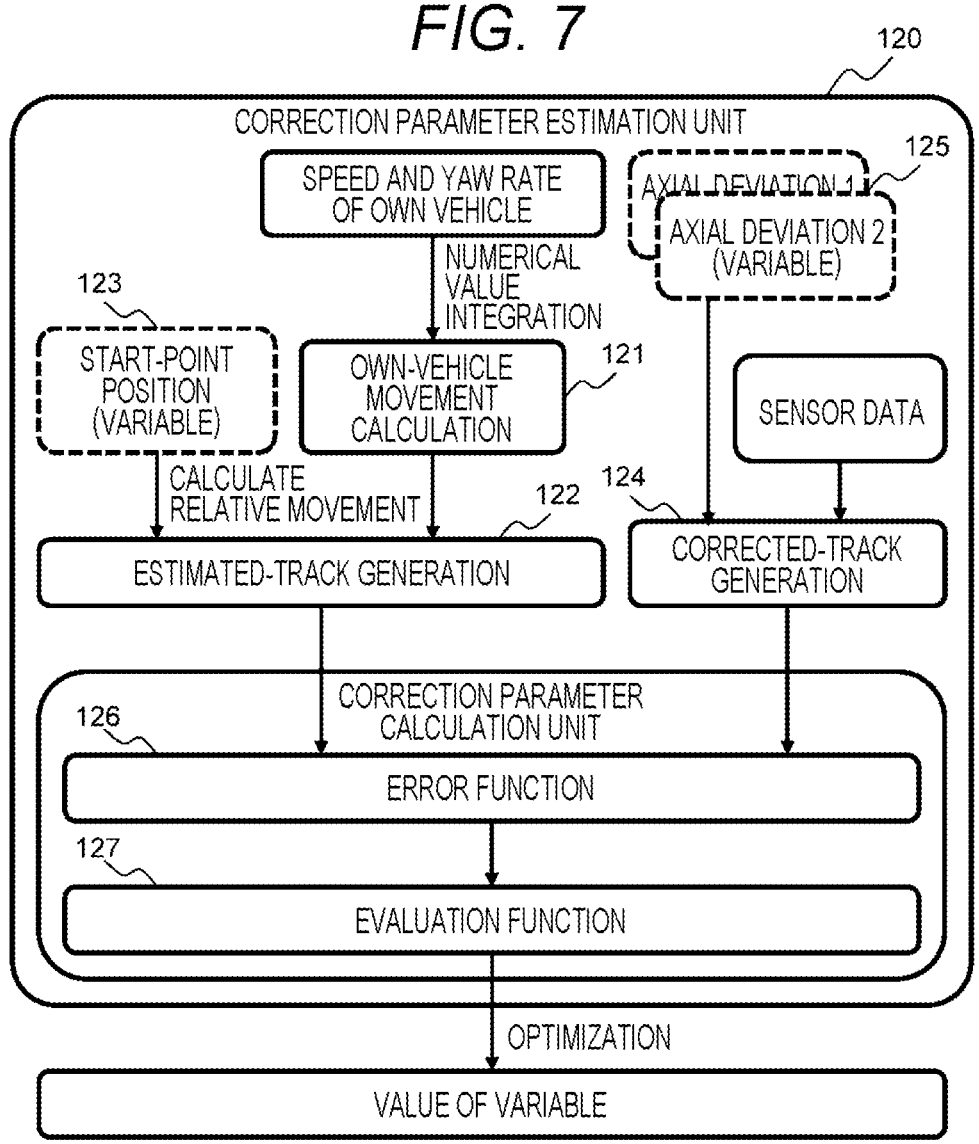
FIG. 7 is a functional block diagram illustrating a correction parameter estimation unit in Embodiment 2.

FIG. 7 is a functional block diagram illustrating a correction parameter estimation unit 120 in Embodiment 2.

The correction parameter estimation unit 120 in Embodiment 1 calculates the sensor-coordinate transformation correction value for correcting the axial deviation in a left-right direction between the first and second vehicle periphery monitoring sensors 10a and 10b, but the correction parameter estimation unit 120 in Embodiment 2 calculates a sensor-coordinate transformation correction value for correcting a general deviation that is not limited to the axial deviation in the left-right direction between the first and second vehicle periphery monitoring sensors 10*a* and 10*b*. Description of components having the same functions as those in Embodiment 1 will be omitted, and different components will be mainly described.

The correction parameter estimation unit 120 in Embodiment 2 includes an own-vehicle movement calculation unit 121, an estimated-track generation unit 122, a corrected-track generation unit 124, an error function 126, and an evaluation function 127. The operations of the own-vehicle movement calculation unit 121, the estimated-track generation unit 122, the error function 126, and the evaluation function 127 are the same as those in Embodiment 1 described above.

The corrected-track generation unit 124 generates a plurality of tracks having different movement directions and different start-point positions by using an axial deviation variable 125 for each of the targets output from the first and second vehicle periphery monitoring sensors 10*a* and 10*b*. The axial deviation variable 125 is a numerical string for giving a deviation of the angular direction and a deviation of the position, that cause the corrected track 430 of the target generated by the corrected-track generation unit 124 to vary. The number of generated corrected tracks 430 of the target and the range of the deviation are determined by the axial deviation variable 125. A function of giving the axial deviation variable 125 may be determined, and the axial deviation variable 125 may be generated by such a function.

In Embodiment 2, the axial deviation between the first and second vehicle periphery monitoring sensors 10*a* and 10*b* are corrected by the deviation of the angular direction, and the front-rear and right-left deviations between the installation positions of the first and second vehicle periphery monitoring sensors 10*a* and 10*b* are corrected by the deviation of the position. Therefore, it is possible to correct an error caused by a deviation other than the axial deviation between the first and second vehicle periphery monitoring sensors 10*a* and 10*b*.

Embodiment 3

Figure 8:
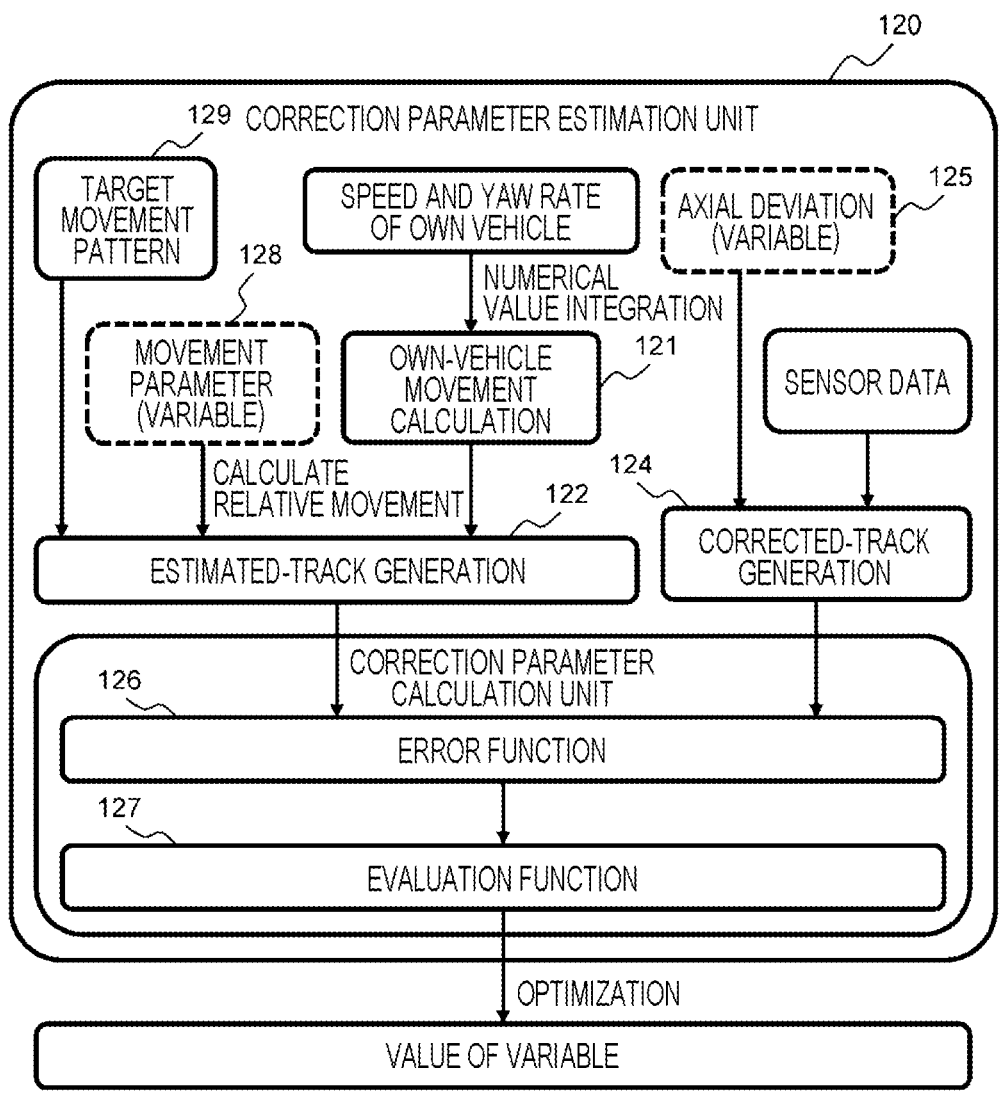
FIG. 8 is a functional block diagram illustrating a correction parameter estimation unit in Embodiment 3.

FIG. 8 is a functional block diagram illustrating a correction parameter estimation unit 120 in Embodiment 3.

The correction parameter estimation unit 120 in Embodiment 1 corrects the deviation between the sensors by using the stationary objects detected by the first and second vehicle periphery monitoring sensors 10*a* and 10*b*, but the correction parameter estimation unit 120 in Embodiment 3 can correct the deviation between the sensors by using moving objects detected by the first and second vehicle periphery monitoring sensors 10*a* and 10*b*. Description of components having the same functions as those in Embodiment 1 will be omitted, and different components will be mainly described.

The correction parameter estimation unit 120 in Embodiment 3 includes an own-vehicle movement calculation unit 121, an estimated-track generation unit 122, a corrected-track generation unit 124, an error function 126, and an evaluation function 127. The operations of the own-vehicle movement calculation unit 121, the corrected-track generation unit 124, the error function 126, and the evaluation function 127 are the same as those in Embodiment 1 described above.

The estimated-track generation unit 122 generates a plurality of estimated tracks 420 having different start-point positions by using a movement parameter variable 128 and a target movement pattern 129 from the track of the target, which is predicted from the movement of the own vehicle. The movement of the own vehicle is calculated by the own-vehicle movement calculation unit 121. The movement parameter variable 128 is a numerical string for giving a deviation of the movement of the target, that causes the estimated track 420 generated by the estimated-track generation unit 122 to vary. The number of generated estimated tracks 420 and the range of the deviation are determined by the movement parameter variable 128. A function of giving the movement parameter variable 128 may be determined, and the movement parameter variable 128 may be generated by such a function. The target movement pattern 129 includes a plurality of known movement patterns of a moving target. One pattern that matches with the movement of the moving target that generates the estimated track 420 is output. The estimated-track generation unit 122 generates the estimated track 420 as a reference of the target in the relative coordinate system based on the own vehicle, by using the calculated movement of the own vehicle and the calculated target movement pattern 129. A deviation is given to the estimated track 420 as the reference by using the movement parameter variable 128 to generate a plurality of estimated tracks 420.

In Embodiment 3, the axial deviation between the first and second vehicle periphery monitoring sensors 10*a* and 10*b* are corrected by using the moving target. Therefore, even in an environment where it is not possible to observe a stationary target, it is possible to correct an error caused by the deviation between the first and second vehicle periphery monitoring sensors 10*a* and 10*b*, by using the moving target.

Embodiment 4

Figure 9:
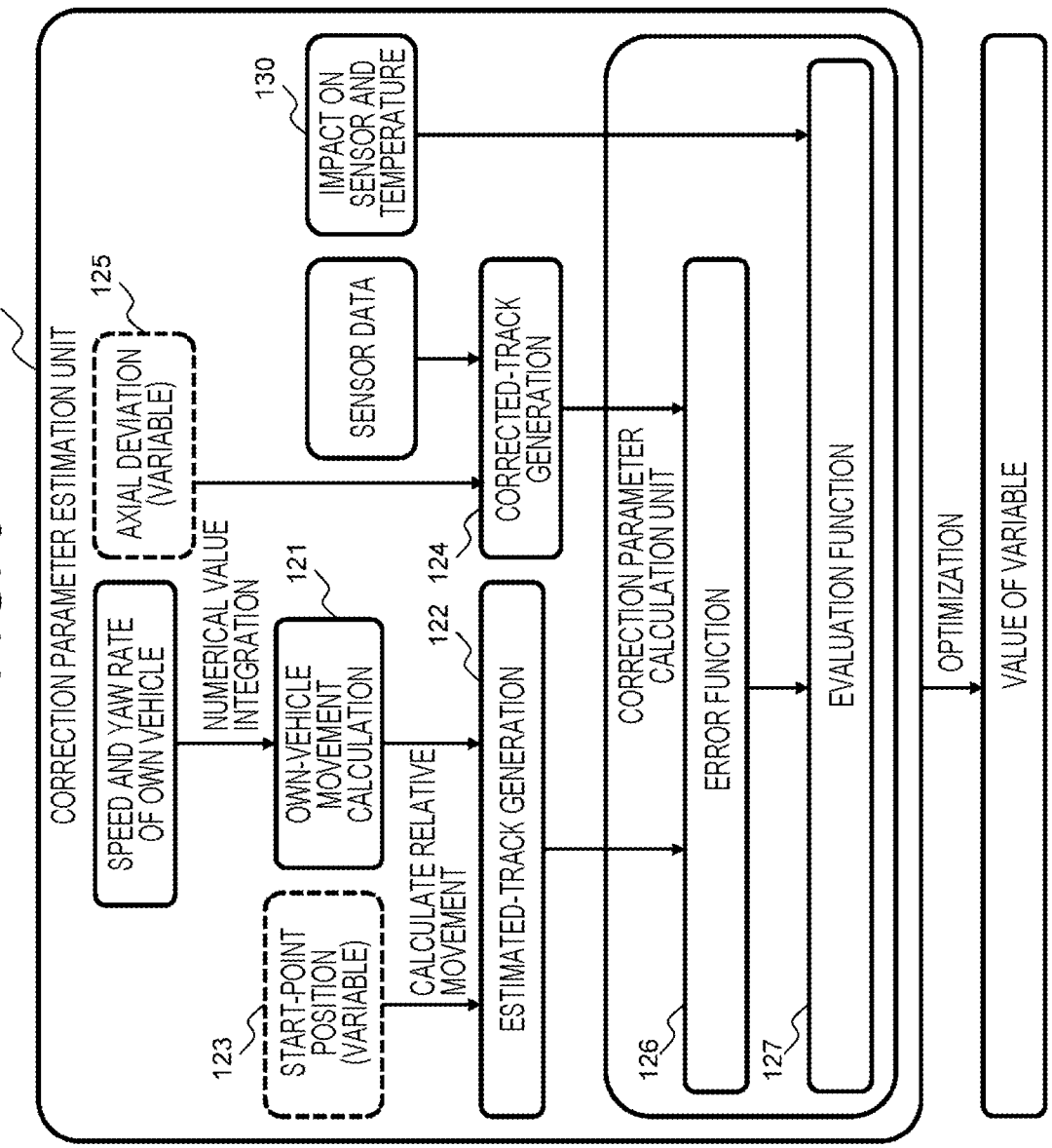
FIG. 9 is a functional block diagram illustrating a correction parameter estimation unit in Embodiment 4.

FIG. 9 is a functional block diagram illustrating a correction parameter estimation unit 120 in Embodiment 4.

The correction parameter estimation unit 120 in Embodiment 4 determines whether or not it is necessary to correct the deviation of the sensor by using the impacts applied to the first and second vehicle periphery monitoring sensors 10*a* and 10*b* and the temperatures of the first and second vehicle periphery monitoring sensors 10*a* and 10*b*. Description of components having the same functions as those in Embodiment 1 will be omitted, and different components will be mainly described.

The correction parameter estimation unit 120 in Embodiment 4 includes an own-vehicle movement calculation unit 121, an estimated-track generation unit 122, a corrected-track generation unit 124, an error function 126, and an evaluation function 127. The operations of the own-vehicle movement calculation unit 121, the estimated-track generation unit 122, the corrected-track generation unit 124, and the error function 126 are the same as those in Embodiment 1 described above.

A state detection sensors (not illustrated) is provided near first vehicle periphery monitoring sensor 10*a* and the second vehicle periphery monitoring sensor 10*b*. The state detection sensor includes an impact sensor and a temperature sensor, and detects an impact and a temperature change of a portion on which each of the first and second vehicle periphery monitoring sensors 10*a* and 10*b* is mounted. The state detection sensor (impact sensor and temperature sensor) may be mounted on a place where an impact applied to the entirety of the vehicle, such as a chassis of the own vehicle, is easily detected, and detect an impact applied to any place and a temperature change.

When the state detection sensor detects an impact which is equal to or greater than a threshold held stored in advance, it is estimated that an abnormality has occurred in the mounting state of the vehicle periphery monitoring sensor 10*a* or 10*b* in the vicinity thereof, and abnormal impact data 130 is output to enable the evaluation function 127. In addition, when the state detection sensor detects a temperature that exceeds an operation range stored in advance, it is estimated that the vehicle periphery monitoring sensor 10*a* or 10*b* in the vicinity thereof becomes a high temperature or a low temperature and an abnormality occurs in the mounting state, and abnormal temperature data 130 is output in order to enable the evaluation function 127.

The correction parameter estimation unit 120 determines whether an abnormality has occurred in the mounting states of the first and second vehicle periphery monitoring sensors 10*a* and 10*b*, based on the impact data and the temperature data 130, which are output from the state detection sensor. Then, the correction parameter estimation unit 120 transmits the determination result to the evaluation function 127.

When it is determined that an abnormality has occurred in the first and second vehicle periphery monitoring sensors 10*a* and 10*b*, the evaluation function 127 starts the operation to select one combination for calculating the sensor-coordinate transformation correction value, and calculate the sensor-coordinate transformation correction value.

In Embodiment 4, when the state detection sensor detects at least one of an abnormal impact and an abnormal temperature, the sensor-coordinate transformation correction value is calculated. Thus, when no abnormality occurs, the sensor-coordinate transformation correction value is not calculated, and thus it is possible to reduce the processing load.

The components, processing flows, and operations of the functional blocks described in each embodiment may be randomly combined.

Further, in the above description, the in-vehicle device (ECU) calculates the sensor-coordinate transformation correction value, but a computer communicably connected to the vehicle may calculate the sensor-coordinate transformation correction value.

As described above, the aiming device calculates a correction parameter for correcting a detection result of a target sensor (vehicle periphery monitoring sensors 10*a* and 10*b*). The aiming device includes the estimated-track generation unit 122 that detects a track of a target for a period when the own vehicle is moving, by using information of a movement of the own vehicle, which is detected by a movement sensor, and generates a plurality of estimated tracks 420 having different start points from the detected track of the target by using a first variable group (start-point position variable 123 and movement parameter variable 128), the corrected-track generation unit 124 that generates a plurality of corrected tracks 430 by using a second variable group (axial deviation variable 125) from the track of the target around the own vehicle, which are detected by the vehicle periphery monitoring sensors 10*a* and 10*b*, the correction parameter calculation unit (error function 126 and evaluation function 127) that selects a combination in which the difference between the estimated track 420 and the corrected track 430 is small, and calculates the correction parameter for correcting the displacement of the vehicle periphery monitoring sensors 10*a* and 10*b* by using a first variable related to the selected estimated track 420 and a second variable related to the selected corrected track 430. Thus, it is possible to automatically correct the axial deviation between the vehicle periphery monitoring sensors 10*a* and 10*b*. In addition, it is possible to correct not only the axial deviation but also various displacements. That is, since the relative direction of the target is influenced by a plurality of pieces of information, when deviations other than the left-right axial deviation are included, the value of the axial deviation may be erroneously estimated in a known method of explicitly obtaining the axial deviation. In the method in the present embodiment, it is not possible to explicitly calculate the axial deviation, but it is possible to approximately obtain the value of the axial deviation to be calculated.

In addition, the correction parameter calculation unit can execute the first procedure (translation optimization procedure S111) for specifying a combination in which the centroid of the estimated track 420 and the centroid of the corrected track 430 are close, the second procedure (rotation optimization procedure S112) for specifying a combination in which the angle between the estimated track 420 and the corrected track 430 is small, and the third procedure (expansion/contraction optimization procedure S113) for specifying a combination in which the length of the estimated track 420 and the length of the corrected track 430 are close, and selects a combination in which the difference between the estimated track 420 and the corrected track 430 is small by sequentially repeatedly executing the first procedure (S111), the second procedure (S112), and the third procedure (S113). Therefore, it is possible to accurately select a combination of one estimated track 420 and the corrected track 430.

In addition, the estimated-track generation unit 122 detects a track of a target with a known movement pattern by using the information of the movement of the own vehicle, and generates a plurality of estimated tracks 420 having different start points by using the first variable group and the movement pattern. Thus, it is possible to calculate the correction parameter for correcting the displacement of the vehicle periphery monitoring sensors 10*a* and 10*b* by using a moving target.

In addition, when at least one of an impact applied to the own vehicle and a temperature of the own vehicle, which are detected by the state detection sensor, is input and at least one of the impact and the temperature satisfies a predetermined condition, the correction parameter is output. Thus, when no abnormality occurs, the sensor-coordinate transformation correction value is not calculated, and thus it is possible to reduce the processing load.

In addition, the first variable group (start-point position variable 123 and movement parameter variable 128) includes a plurality of variables that change the start point of the estimated track 420 to at least one of the front, rear, left, and right directions, and the estimated-track generation unit 122 generates a plurality of estimated tracks 420 having different start points in the front, rear, left, and right directions by using the first variable group. Thus, it is possible to accurately correct the axial deviation between the vehicle periphery monitoring sensors 10*a* and 10*b*.

In addition, the second variable group (axial deviation variable 125) includes a plurality of variables that change the direction of the corrected track 430, and the corrected-track generation unit 124 generates a plurality of corrected tracks 430 having different directions by using the second variable group from the tracks of the target detected by the vehicle periphery monitoring sensors 10*a* and 10*b*. Thus, it is possible to accurately correct the axial deviation between the vehicle periphery monitoring sensors 10*a* and 10*b*.

In addition, since the vehicle periphery monitoring sensors 10a and 10b are millimeter-wave radars or cameras, it is possible to calculate correction amounts of various types of vehicle periphery monitoring sensors 10a and 10b.

The present invention is not limited to the above-described embodiments, and includes various modifications and equivalent configurations within the spirit of the appended claims. For example, the above embodiments are described in detail in order to explain the present invention in an easy-to-understand manner, and the present invention is not necessarily limited to a case including all the described configurations. In addition, a portion of the configuration of one embodiment may be replaced with the configuration of another embodiment. Further, the configuration of one embodiment may be added to the configuration of another embodiment. Regarding some components in the embodiments, other components may be added, deleted, and replaced.

In addition, some or all of the above-described configurations, functions, processing units, processing means, and the like may be realized by hardware by, for example, designing with an integrated circuit, or may be realized by software by a processor interpreting and executing a program for realizing each function.

Information such as a program, a table, and a file, that realizes each function can be stored in a memory, a storage device such as a hard disk and a solid state drive (SSD), or a recording medium such as an IC card, an SD card, a DVD, and a BD.

Control lines and information lines considered necessary for the descriptions are illustrated, and not all the control lines and the information lines in mounting are necessarily shown. In practice, it may be considered that almost all components are connected to each other.

REFERENCE SIGNS LIST 1 sensor fusion device
2 driving control device
10a, 10b vehicle periphery monitoring sensor
20 own-vehicle movement detection sensor
30 lane marker detection sensor
40 transmission sensing information
100 sensor coordinate transformation unit
110 sensor time-point synchronization unit
120 correction parameter estimation unit
121 own-vehicle movement calculation unit
122 estimated-track generation unit
123 start-point position variable
124 corrected-track generation unit
125 axial deviation variable
126 error function
127 evaluation function
128 movement parameter variable
129 target movement pattern
130 impact data, temperature data
200 sensor data integration unit
340 target detection start determination unit
400 sensor data
410 true trajectory
420 estimated track
430 corrected track

The invention claimed is:
1. An aiming device comprising:
a movement sensor to detect a movement of an own vehicle;
a target sensor to detect a target around the own vehicle, wherein the target sensor is a millimeter-wave radar or a camera; and
one or more memory devices having a program stored thereon that, when executed by one or more processors, cause the one or more processors to:
detect a track of the target for a period when the own vehicle moves, based at least in part on the movement of the own vehicle;
generate a plurality of estimated tracks having different start-point positions from the detected track of the target based at least in part on a first variable group including a start-point position variable and a movement parameter variable, wherein the start-point position variable is a numerical string to indicate a deviation of the start-point position that causes a corresponding one of the plurality of estimated tracks to vary, and the movement parameter variable is a numerical string to indicate a deviation of a movement of the target that causes the corresponding one of the plurality of estimated tracks to vary;
generate a plurality of corrected tracks based at least in part on the track of the target and a second variable group including an axial deviation variable that is a numerical string to indicate a deviation of an angular direction that causes a corresponding one of the plurality of corrected tracks to vary;
calculate a difference for each combination between the plurality of estimated tracks and the plurality of corrected tracks;
identify one of the plurality of estimated tracks and one of the plurality of corrected tracks, a combination having a smallest value of the difference;
calculate a correction parameter for correcting a displacement of the target sensor based at least in part on a first variable related to the identified one estimated track and a second variable related to the identified one corrected track; and
correct a detection result of the target sensor based at least in part on the correction parameter.

2. The aiming device according to claim 1, wherein the one or more processors are configured to:
perform:
a first procedure of specifying a combination in which a centroid of one of the plurality of estimated tracks and a centroid of one of the plurality of corrected tracks are closest to each other,
a second procedure of specifying a combination in which an angle between one of the plurality of estimated tracks and one of the plurality of corrected tracks is smallest, and
a third procedure of specifying a combination in which a length of one of the plurality of estimated tracks and a length of one of the plurality of corrected tracks are closest to each other, and
select a combination in which the difference between one of the plurality of estimated tracks and one of the plurality of corrected tracks is smallest, by sequentially repeating the first procedure, the second procedure, and the third procedure.

3. The aiming device according to claim 1, wherein the one or more processors are configured to:
the track of the target having a known movement pattern based at least in part on the movement of the own vehicle, and generate the plurality of estimated tracks based at least in part on the first variable group and the known movement pattern.

4. The aiming device according to claim 1, further comprising a state detection sensor to detect at least one of an impact applied to the own vehicle and a temperature of the own vehicle is input, and output the correction parameter when at least one of the impact and the temperature satisfies a predetermined condition.

5. The aiming device according to claim 1, wherein
the first variable group includes a plurality of variables that change the start-point positions of the plurality of estimated tracks in at least one of forward, backward, leftward, or rightward directions, and
the one or more processors are configured to generate the plurality of estimated tracks having the different start-point positions in the at least one of the forward, backward, leftward, or rightward directions based at least in part on the first variable group.

6. The aiming device according to claim 1, wherein
the second variable group includes a plurality of variables that change directions of the plurality of corrected tracks, and
the one or more processors are configured to generate the plurality of corrected tracks having different directions from the track of the target based at least in part on the second variable group.

7. A driving control system that controls driving of a vehicle, the driving control system comprising:
a movement sensor to detect a movement of the vehicle;
two or more target sensors to detect a target around the vehicle, wherein at least one of the two or more target sensors is a millimeter-wave radar or a camera; and
one or more memory devices having a program stored thereon that, when executed by one or more processors, cause the one or more processors to:
detect a track of a target for a period when the vehicle moves, based at least in part on the movement of the vehicle;
generate a plurality of estimated tracks having different start-point positions from the detected track of the target based at least in part on a first variable group including a start-point position variable and a movement parameter variable, wherein the start-point position variable is a numerical string to indicate a deviation of the start-point position that causes a corresponding one of the plurality of estimated tracks to vary, and the movement parameter variable is a numerical string to indicate a deviation of a movement of the target that causes the corresponding one of the plurality of estimated tracks to vary;
generate a plurality of corrected tracks based at least in part on the track of the target and a second variable group including an axial deviation variable that is a numerical string to indicate a deviation of an angular direction that causes a corresponding one of the plurality of corrected tracks to vary;
calculate a difference for each combination between the plurality of estimated tracks and the plurality of corrected tracks;
identify one of the plurality of estimated tracks and one of the plurality of corrected tracks, a combination having a smallest value of the difference;
calculate a correction parameter for correcting a displacement of one or more of the two or more target sensors based at least in part on a first variable related to the identified one estimated track and a second variable related to the identified one corrected track;
transform information on the target from a coordinate system unique to the two or more target sensors into a predetermined unified coordinate system based at least in part on the calculated correction parameter; and
integrate detection results of the two or more target sensors and output an integration result; and
control the driving of the vehicle based at least in part on an output of integrated detection results of the two or more target sensors.

8. A method for an aiming device, the method comprising:
detecting, by a movement sensor, a movement of an own vehicle;
detecting, by a target sensor, a target around the own vehicle, wherein the target sensor is a millimeter-wave radar or a camera;
detecting a track of the target for a period when the own vehicle moves, based at least in part on the movement of the own vehicle
generating a plurality of estimated tracks having different start-point positions from the detected track of the target based at least in part on a first variable group including a start-point position variable and a movement parameter variable, wherein the start-point position variable is a numerical string to indicate a deviation of the start-point position that causes a corresponding one of the plurality of estimated tracks to vary, and the movement parameter variable is a numerical string to indicate a deviation of a movement of the target that causes the corresponding one of the plurality of estimated tracks to vary;
generating a plurality of corrected tracks based at least in part on the track of the target and a second variable group including an axial deviation variable that is a numerical string to indicate a deviation of an angular direction that causes a corresponding one of the plurality of corrected tracks to vary;
calculating a difference for each combination between the plurality of estimated tracks and the plurality of corrected tracks; and
identifying one of the plurality of estimated tracks and one of the plurality of corrected tracks, a combination having a smallest value of the difference;
calculating a correction parameter for correcting a displacement of the target sensor based at least in part on a first variable related to the identified one estimated track and a second variable related to the identified one corrected track; and
correcting a detection result of the target sensor based at least in part on the correction parameter.

* * * * *